Oct. 6, 1931.　　　A. W. CAPS　　　1,826,599
COPY CONVEYER FOR PHOTOGRAPHIC APPARATUS
Filed Feb. 29, 1928　　7 Sheets-Sheet 3
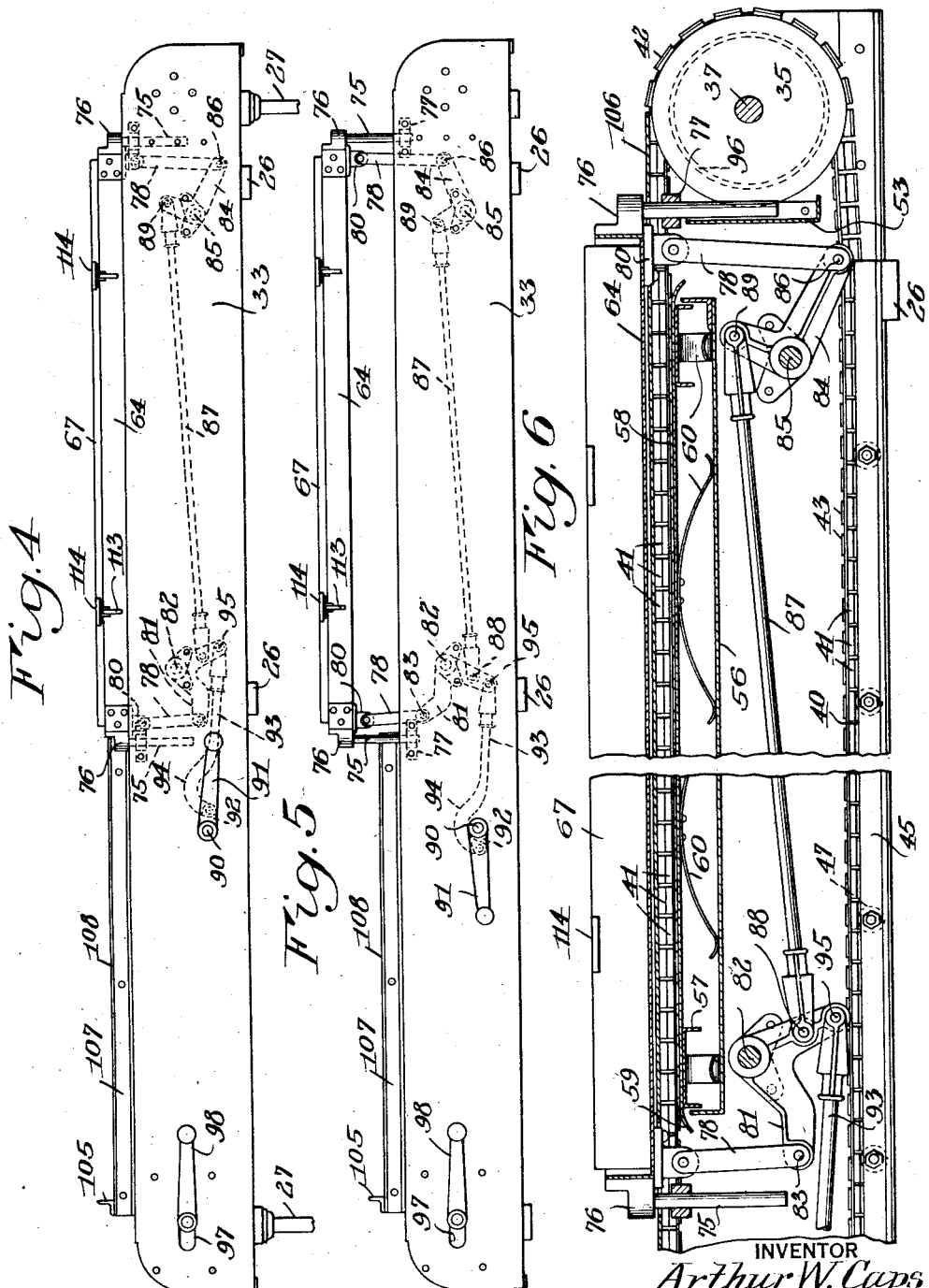
INVENTOR
Arthur W. Caps
BY
his ATTORNEYS

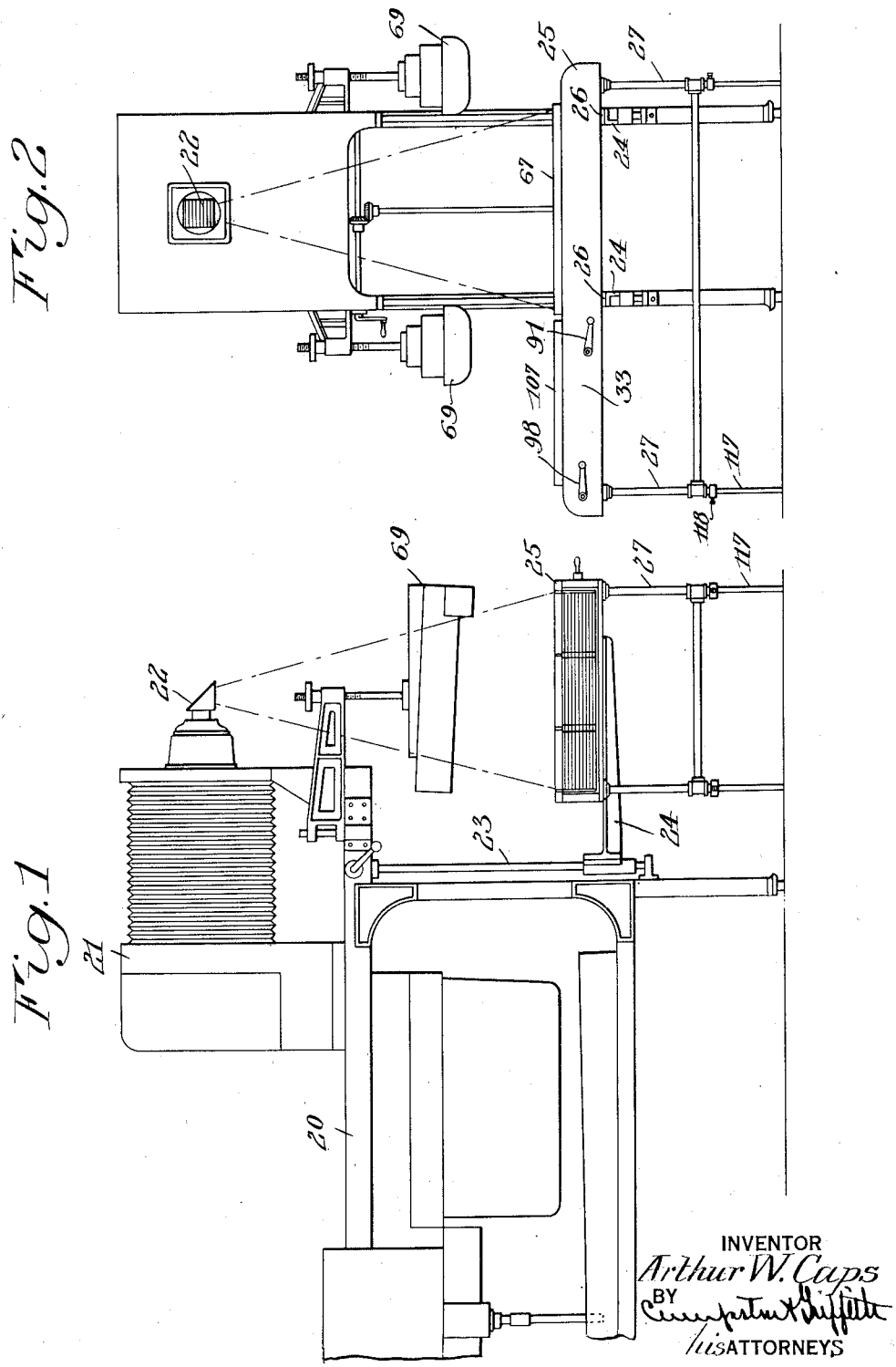

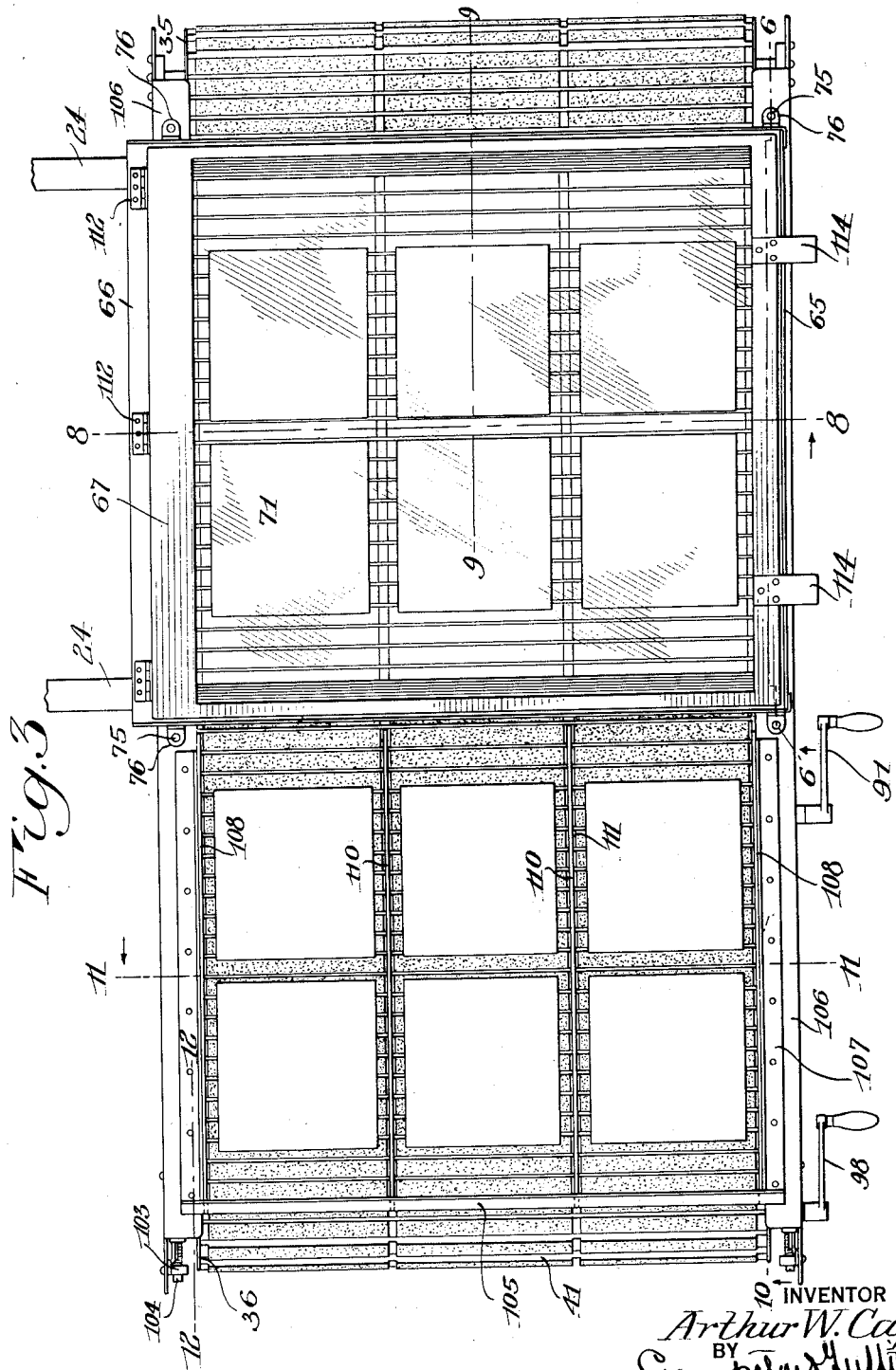

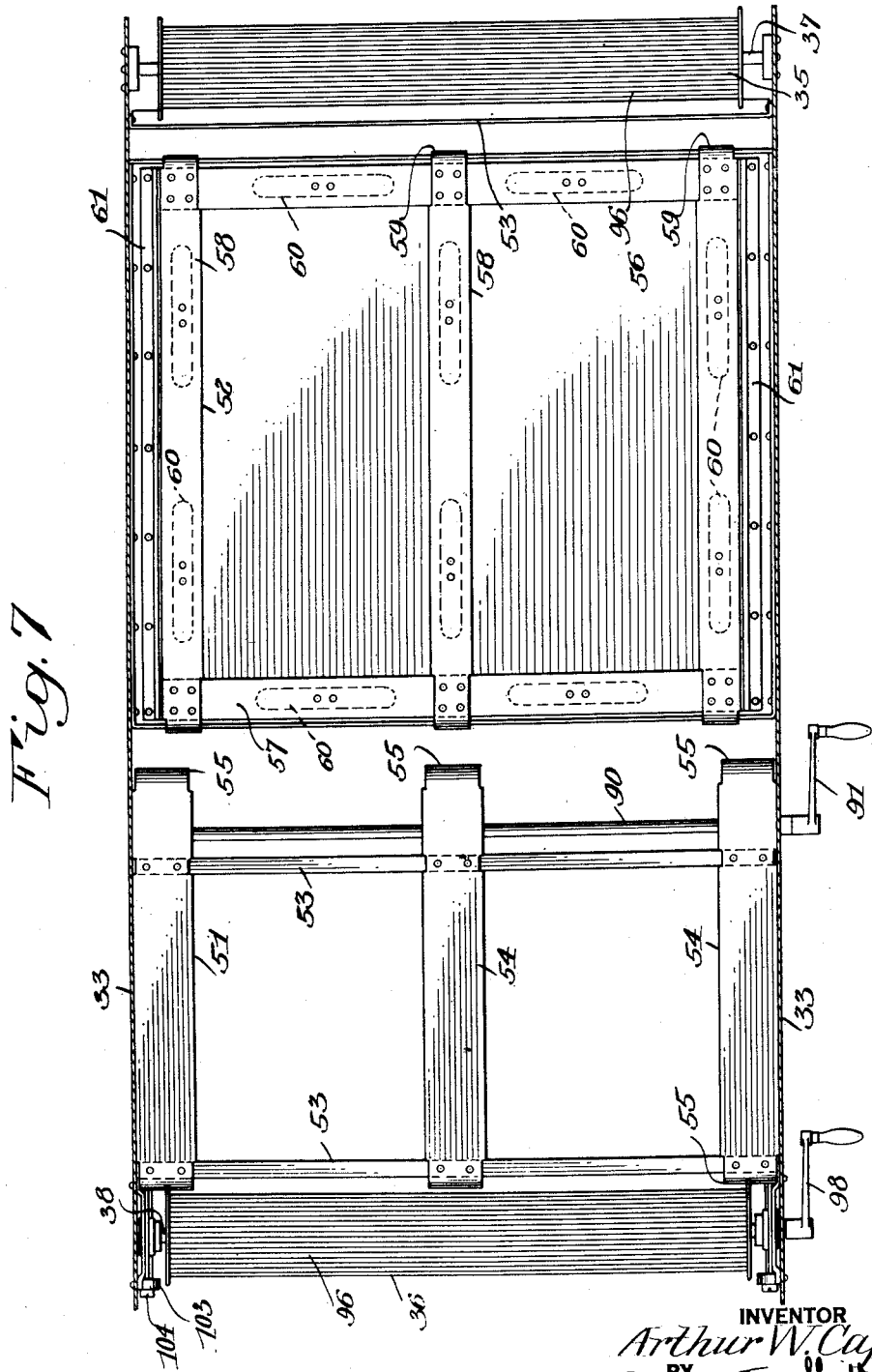

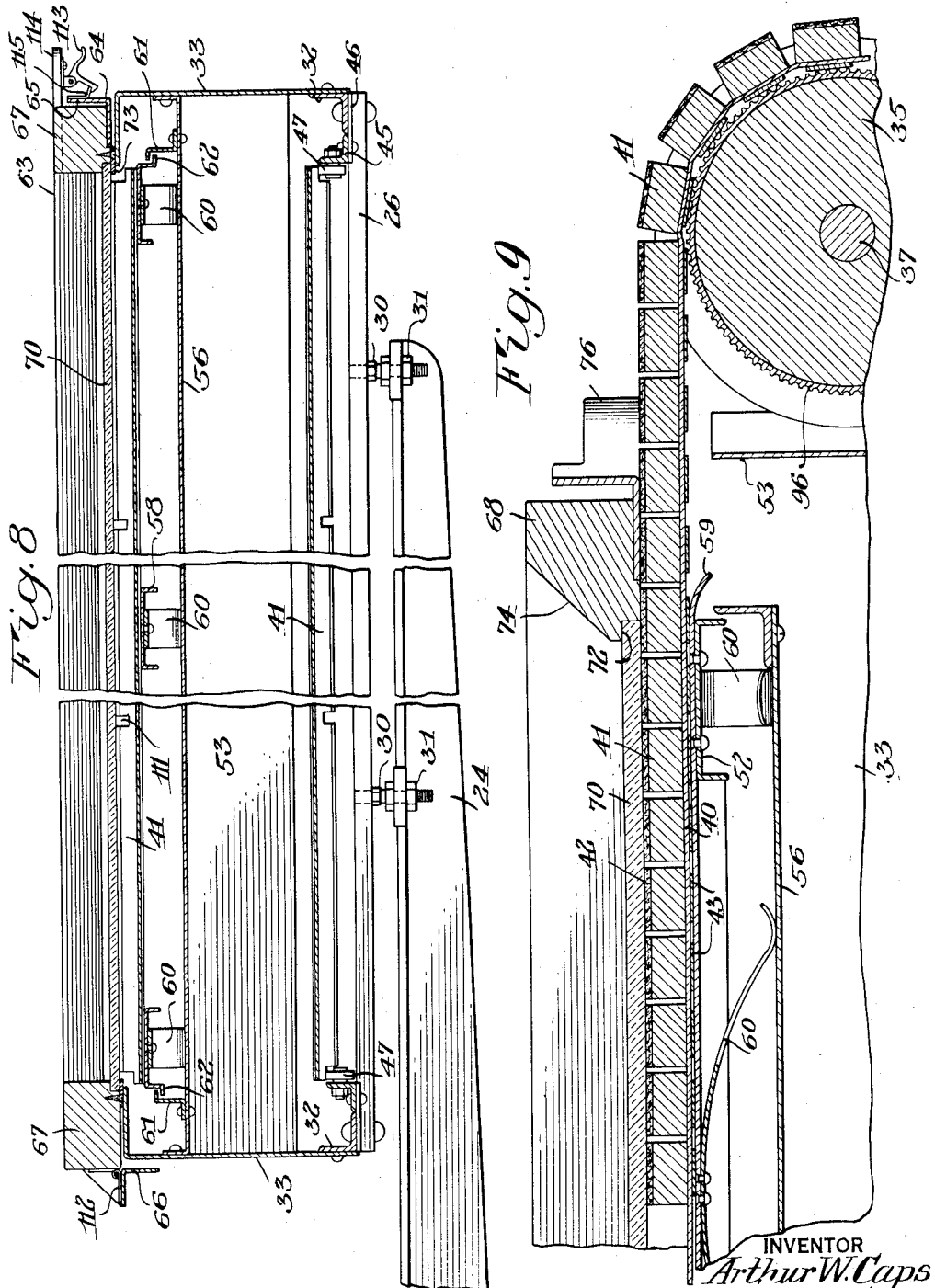

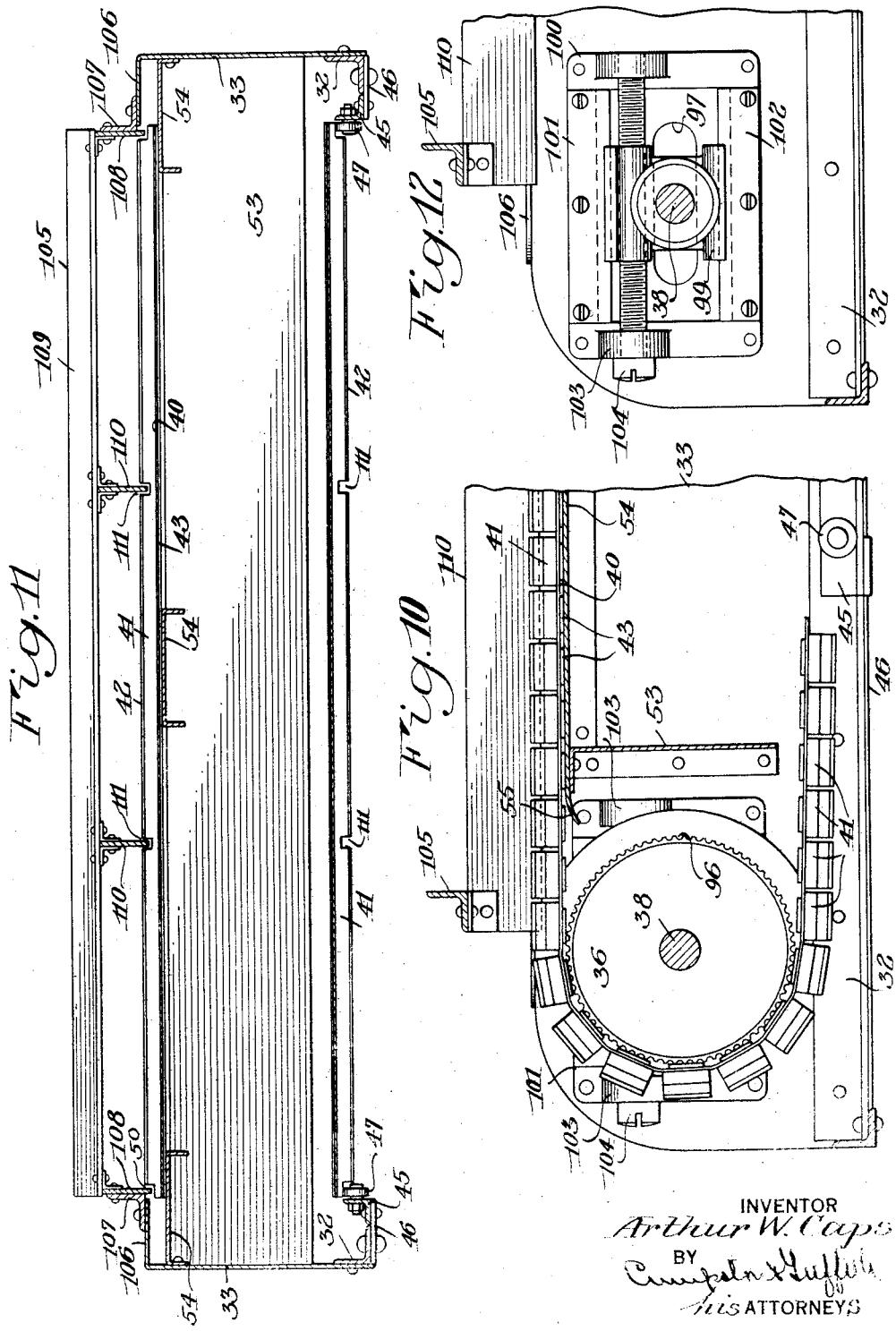

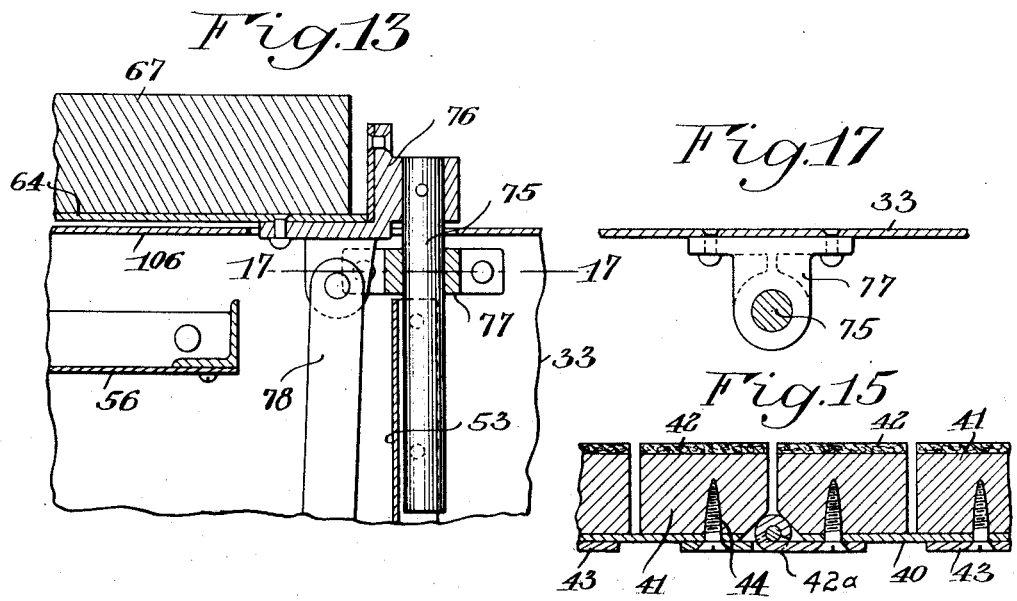
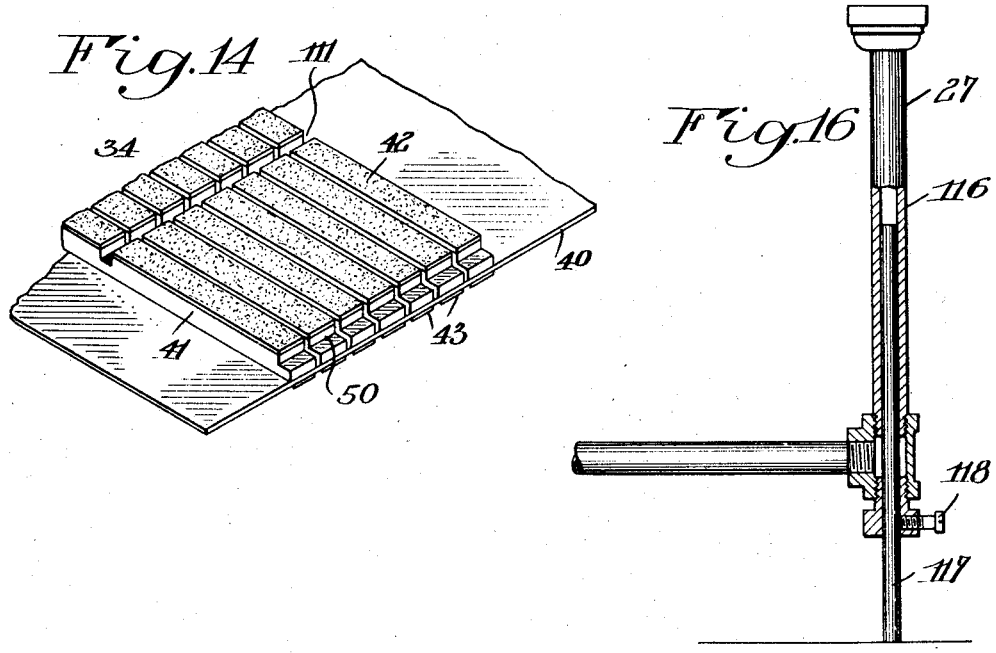

Patented Oct. 6, 1931

1,826,599

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

COPY CONVEYER FOR PHOTOGRAPHIC APPARATUS

Application filed February 29, 1928. Serial No. 258,015.

The present invention relates to photographic apparatus and more particularly to photographic cameras of the type known as commercial cameras which are adapted to make prints of documents and like objects. In this type of apparatus the documents to be photographed are disposed within the field of the lens and, after exposure thereof for the proper length of time, the copies or documents are removed and replaced by others. This invention is directed toward the idea of speeding up the production of prints by the provision of mechanism adapted to hold the documents in position outside the camera field, and by which the document or documents thus positioned may be quickly and accurately shifted to the proper point within the camera field where they are held during exposure. Afterwards the exposed documents may be further shifted out of the camera field to be replaced by succeeding documents to be photographed as a continuous operation, and the invention has for its general object the provision of an efficient and serviceable apparatus of this nature by means of which the documents may be accurately assembled and positioned before being moved into the camera field, may be readily shifted into exposing position, and thereafter may be moved out of the camera field.

To these and other ends the invention resides in certain improvements and combinations of parts, all as will be hereinafter more fully described, the novel features being pointed out in the claims at the end of the specification.

In the drawings:

Fig. 1 is a side elevation of a photographic copying camera having embodied therein the apparatus of the present invention;

Fig. 2 is a front elevation of the same;

Fig. 3 is a plan view of a copyholding conveyer constructed in accordance with and illustrating one embodiment of the present invention;

Fig. 4 is a fragmentary side elevation of the conveyer illustrating the hold-down member in lowered position;

Fig. 5 is a view similar to Fig. 4 illustrating the hold-down member in raised position;

Fig. 6 is a sectional view taken substantially on line 6—6 of Fig. 3;

Fig. 7 is a horizontal sectional view illustrating the copyholding conveyer frame with the conveying member removed therefrom;

Fig. 8 is a transverse sectional view taken substantially on line 8—8 of Fig. 3;

Fig. 9 is a fragmentary sectional view taken substantially on line 9—9 of Fig. 3;

Fig. 10 is a fragmentary sectional view taken substantially on line 10—10 of Fig. 3;

Fig. 11 is a transverse sectional view taken substantially on line 11—11 of Fig. 3;

Fig. 12 is a detailed view illustrating the mechanism used for tightening the conveyer belt taken substantially on line 12—12 of Fig. 3;

Fig. 13 is a fragmentary detail illustrating the mechanism for guiding the copy-holding frame in its vertical movement;

Fig. 14 is a fragmentary perspective view of the conveying member;

Fig. 15 is a fragmentary sectional view showing the manner of attaching the conveyer slats to the belt;

Fig. 16 is a detail view, partly in section, illustrating the mechanism for vertically adjusting the copyholder conveyer, and Fig. 17 is a fragmentary detail taken on line 17—17 of Fig. 13.

Similar reference numerals throughout the several views indicate the same parts.

In a general way the present embodiment of the invention, as shown, comprises a framework 20 of a photographic camera having an exposure chamber 21, and a lens and prism 22 which are mounted on the frame 20 for relative focusing adjustment thereon. At the front of the frame 20 is provided a guide 23 adapted to support arms 24 for vertical adjustment therealong.

In devices of this character the arms 24 are usually employed for carrying a board or table which supports documents to be photographed in proper position relatively to the lens and prism 22. In the present embodiment, however, the arms 24 are preferably utilized as a partial support for a copyholding conveyer, designated as a whole at 25, by means of which the documents or other objects to be photographed may be effectively brought within the range of the camera lens. The copyholding conveyer 25 is preferably formed with lower cross pieces 26, forming the base of the conveyer frame, which is supported on adjustable legs 27 suitably secured to the end cross pieces 26 as shown in Figs. 1 and 4.

For the purpose of rigidly holding the conveyer in place relatively to the frame 20, it is preferably connected in an adjustable manner to the arms 24 by means of adjusting screws 30 and lock nuts 31, as best shown in Fig. 8.

Disposed lengthwise of the cross pieces 26 at the ends thereof are angle irons 32, to the upwardly projecting flanges of which are secured the sides 33 of the conveyer frame. A flexible conveying member, designated as a whole at 34, is supported at its ends upon the conveyer frame 25 by means of flanged rolls 35 and 36 which are mounted respectively upon shafts 37 and 38, journalled in the side walls 33 at the ends of the conveyer frame.

Any suitable form of conveying member may be utilized, but in the preferred embodiment of the invention this conveying member comprises a belt of canvas or other suitable strong fabric indicated at 40, see particularly Figs. 14 and 15. Upon this conveyer belt there is provided a number of bars or slats 41, somewhat spaced as indicated in Fig. 15, and secured to the belt by means of glue or other adhesive. The slats or bars 41 are preferably provided with strips 42 of soft fabric, such as felt, upon their carrying surfaces to prevent tearing of the documents carried thereby. For the purpose of additionally strengthening the conveying member a bar 43 preferably of metal is provided on the opposite side of the conveyer belt from each slat 41 and is held in place by suitable fastening means such as wood screws 44 passing through the strips 42, through the conveyer belt and into the slats. The ends of the conveyer belt are preferably joined, as illustrated in Fig. 15, by means of a hinge member 42a secured to the slats 41 by screws 44 in a manner similar to the attachment of bars 43.

Suitable means are provided on the conveyer frame 25 for holding the upper and lower runs of the conveyer from sagging. For the purpose of supporting the lower run a pair of angle irons 45 are disposed lengthwise of the angle irons 32 and are held in position relatively thereto by means of a bridging strip 46 suitably riveted or otherwise secured to the horizontal portions of each. The vertical portion of the angles 45 suitably support a plurality of anti-friction rolls 47 spaced lengthwise therealong, see Figs. 6 and 11. Each of the conveyer slats or bars 41 is provided with an offset end formed by cutting away a portion thereof, as shown at 50, see Fig. 14.

Referring particularly to Figs. 6, 7, 9 and 10, the upper run of the conveyer member is shown supported upon frames 51 and 52. The frame 51 comprises, in the present instance, a pair of transversely extending members 53 upon which are secured a plurality of longitudinally disposed beams 54 which are suitably provided with downwardly curved ends 55, see Figs. 7 and 10, for the purpose of facilitating the movement of the conveying member onto the frame 51.

Each of the frames 51 and 52 may be rigidly mounted on the frame, but in the present instance the frame 52 is preferably yieldably mounted for downward movement relatively thereto for a purpose which will be soon apparent. In order to provide for the yielding mounting of the frame 52, there is provided beneath this frame a transversely disposed partition member 56 secured to the sides 33 of the conveyer frame. The frame 52, in the present instance, is composed of transversely extending members 57 and longitudinally extending members 58, the latter having downturned ends 59 similar to ends 55. On the under side of the members 57 and 58 of the frame 52 are secured a number of springs, herein shown as leaf springs 60, which bear at their free ends upon the transverse partition 56 and serve to yieldingly hold the frame 52 spaced therefrom. For the purpose of limiting the effect of the springs 60 there is provided on two sides of the frame 52 a pair of Z bars 61 which engage above an outwardly offset edge 62 formed on each of the outer members 58 of the frame 52.

A hold-down cover member 63 is preferably provided for holding documents flat on the conveyer while being photographed. In the present instance, this cover member is located adjacent the portion of the conveyer which is yieldably mounted upon the frame 25. The cover member 63 preferably comprises a sheet metal frame 64 having upwardly turned flanges 65 at the front and two sides thereof and a downwardly turned flange 66 at the rear, as best shown in Figs. 3 and 8. Secured within this frame 64 is a frame formed of side bars 67 and end bars 68, preferably of wood. This frame supports a transparent plate 70, preferably of glass, which is adapted to bear against the documents 71 placed on the flexible conveying member 34, see Fig. 3. The glass plate 70 may be secured to the bars 67 and 68 in any convenient manner, but in the present instance, the bars are cut away at their corners as at 72 to receive the edges of the plate and metal corner pieces 73 are provided at each corner of the glass for holding the same rigidly to the bars 67 and 68.

For the purpose of preventing obstruction to the rays of light passing from the lighting elements 69 used with the apparatus, the bars 68 are preferably beveled on their inner sides, as shown at 74 in Fig. 9.

Means are provided for moving the frame 64 toward and from the conveying element to allow the free and unobstructed movement of documents thereunder and to permit the documents to be held in flat position on the conveyer when they are ready to be photographed. To this end there is provided, preferably at each corner of the frame 64, a guide post 75 suitably secured to the frame as by means of a bracket 76 and slidable within openings formed in brackets 77 secured to the side walls 33 of the conveyer frame. By this mechanism the hold-down frame 64 is guided for vertical movement into and out of contact with the supporting surface of the conveying member.

For the purpose of controlling the raising and lowering of the frame 64, a depending link 78 is pivoted at each corner thereof near the guide posts 75 upon the bracket 80. A pair of bell cranks 81 is mounted on the shaft 82, and is connected at 83 to the links 78 at one end of the frame 64, and at the other end of the frame there is provided a pair of bell cranks 84 on a shaft 85 having an end thereof pivotally connected at 86 to the other pair of links 78. For the purpose of moving the bell cranks 81 and 84 in unison, they are suitably connected with a rod 87 pivotally connected at 88 to bell crank 81 and to the bell crank 84 at 89. Thus when the bell crank 81 is rocked in a clockwise direction as seen in Fig. 6, there will be produced a corresponding rocking of the bell crank 84 in the opposite direction thus lifting the frame 64 uniformly at each corner.

A toggle mechanism is preferably provided for actuating the bell cranks and for locking them in both the raised and lowered position of the cover. This toggle mechanism preferably comprises a shaft 90, which projects through the front wall 33 of the conveyer frame and has secured thereto crank 91. The shaft 90 carries rigidly therewith a pair of short crank arms, one of which is shown at 92. A toggle link 93 is provided for each crank arm 92 and has a curved end 94, which is pivotally connected to said link. The other end of the link 93 is pivotally connected at 95 to the end of bell crank 81. The arrangement of the crank arms 92 and the curved end 94 of the link 93 is such that when the crank 91 is in the position shown in Fig. 4 the pivotal connection between the link 93 and the crank arm 92 is slightly below a straight line drawn from the center of shaft 90 to the center of the pivotal connection 81, and the cover 63 will thus be locked in lowered position against the conveying member. When the crank 91 is in the position shown in Fig. 5, the pivotal connection between the crank arm 92 and the link 93 will be in the oppositely locked position, as will be readily understood.

In using the mechanism just described, the documents or other objects will be placed at the left hand end of the conveyer, as shown in Fig. 3, and with the cover 63 in raised position the conveyer will be operated to move the documents beneath the cover in position to be photographed. When the documents are thus positioned, the cover is lowered in the manner just described, causing the documents to be held in a thoroughly flattened out condition thereon. When the cover is in normally lowered position, it depresses the conveyer at the point where it is supported by the yieldably mounted frame 52.

The mechanism for driving the conveyer will now be described. As previously stated, the conveyer member 34 is supported at its ends on the frame 25 by rollers 35 and 36. The roller 35, in the present instance, is idle and the roller 36 is driven. For the purpose of preventing slipping of the conveying member upon the rollers, the face of each roller is provided with a strip 96 of corrugated rubber or like material. The roller 36 is mounted upon its shaft 38 for rotation therewith by means of a key or similar connection. The shaft projects outwardly through a slot 97 in the front wall 33 of the conveyer frame, and has secured at its end a crank 98. This shaft 38 is supported at its ends by a shiftable bearing 99.

Means are provided for adjusting the position of the bearing 98 longitudinally of the conveyer frame to tighten or loosen the engagement of the conveying member with the rollers 35 and 36. For this purpose a guide frame member 100, preferably in the form of a casting, is secured to the inner side of each of the walls 33 on the conveyer frame. On the upper and lower sides of this frame member 100 are provided a pair of inwardly projecting guide bars 101 and 102, which engage in suitable grooves formed in the bearing member 99. At each end of the guide frame 100 are provided bosses 103, which rotatably support a screw 104 having threaded engagement with the bearing member 99. Thus by rotating the screw 104 in one direction or the other, the bearing 99, and consequently the roller 36, may be moved longitudinally of the conveyer frame to loosen or tighten the conveying member.

It should be noted that the conveyer tightening mechanism just described can be very economically constructed as the frame member 100 may be a rough casting on which it is necessary to machine only two parts thereon, namely, the bearings for the screw 104 provided in the bosses 103. The guide strips 101 may be straight machined bars which are merely secured to the frame 100 by use of machine screws.

From the foregoing it is apparent that by rotation of the crank 98 in a clockwise direction, as viewed in Figs. 4 and 5, the conveying member will carry documents placed thereon at its left hand end over toward the right within the range of the camera lens and under the hold-down cover 63.

It is frequently desirable in this construction to assemble a plurality of documents on the conveyer for simultaneous exposure by the camera, and in order to permit the operator to assemble the various documents rapidly without danger of overlapping, there is preferably provided one or more guiding members associated with the conveyer to maintain the documents in a predetermined path of travel. For this purpose, in the present embodiment, there is provided a frame designated generally at 105, see Figs. 3 and 11, which is supported on inwardly bent portions 106 of the side walls 33. The sides of the frame 105 comprise a pair of angle irons 107 suitably secured to the portions 106 and carrying a bar 108 on its vertical face which extends somewhat below the upper surface of the conveying member within the offset or cut-away portion 50 at the ends of the bars or slats 41. The frame 105 has a transversely disposed bridging angle iron 109 supported and secured at its end to the end of bars 108 adjacent the outer or feeding end of the conveyer. The bridging member 109 suitably supports the ends of one or more longitudinally disposed bars 110 similar to bars 108. These bars 110 also project below the face of the conveying member and for this purpose the slats or bars 41 are provided with grooves 111 into which the bars 110 extend. It will be noted that the ends of bars 110 adjacent the cover frame 63 rest within the grooves 111 against the slats 41. With this construction the operator may rapidly place the documents to be photographed on the conveyer in between the guide bars 108 and 111 without any danger of overlapping. It is immaterial whether the document is positioned exactly straight upon the conveyer since this will be taken care of when the prints are trimmed after drying.

It is sometimes desirable to photograph a document which is too large to be received between the bars 108 and 111 and for this purpose means are provided whereby such documents may be placed directly under the hold-down cover without the necessity of operating the conveyer. For this purpose the frame comprising the bars 67 and 68 is pivotally supported within the frame 64, as best shown in Figs. 3 and 8. One or more hinges 112 are secured to the rear bar 67 and to the rear side of frame 64 to thus allow the frame 63 to swing upwardly relatively to the frame 64. For normally holding the frame 63 in position within the frame 64, a pair of spring latches 113 are supported upon the front bars 67 on the frame 63 by means of two outwardly projecting arms 114. These latches are adapted to engage detents 115 supported on the flange 65 at the front of the frame 64.

As previously stated, the legs 27 which support the conveyer frame, are adjustable to vary their lengths. Referring to Fig. 16, it will be seen that the legs 27 comprise an outer tubular member 116 and an inner telescoping rod 117, which may be secured in various extended positions by means of a set screw 118.

In the operation of the device, the conveyer is positioned at a suitable height below the camera lens by shortening or lengthening the legs 27. The arms 24 are adjusted in a position to support the conveyor frame intermediate its legs and is held in this position by means of the set screws 30 and lock nuts 31.

It will be noted, by reference to Fig. 2, that the conveyer frame projects somewhat farther toward one side of the camera than the other. The end of the frame which projects farther outwardly is the end that supports the guide bars 108 and 110. In beginning of the operation of the apparatus, the operator first places a plurality of documents on the projecting end portion of the conveyer, as illustrated at the left in Fig. 3. Then after elevating the hold-down cover 63, by means of the crank 91, he turns the crank 98 to drive the conveyer and thus carry the documents within the range of the camera lens, as illustrated at the right in Fig. 3. After the documents have been positioned the operator ceases to turn the crank 98 and again operates the crank 91 to lower the hold-down frame so that the glass plate 70 bears against the documents and flattens them out upon the conveyer. This operation will also produce a depression of the conveyer by reason of the fact that it is supported on the yielding frame 52. Thus the documents are held tightly between the surface of the conveyer and the glass plate 70. As previously stated, the hold-down frame will be held locked in either of these two extreme positions.

While the documents thus brought within the range of the camera lens are being exposed, the operator proceeds with the assembly of an additional lot of documents upon the conveyer in readiness to be moved within range of the camera.

After the documents have been properly exposed, the hold-down cover is elevated and the conveyer is again moved to bring the new lot of prints within the field of the lens and thus cause the previously exposed prints to move outwardly and automatically drop off of the conveyer at the right, as viewed in Fig. 3. Any suitable container, such as a basket, may be provided below this end of the conveyer to catch the prints thus discharged.

Obviously if desired, the hold-down cover may be dispensed with and the guide bars 108 and 110 may be extended substantially the entire length of the conveyer to guide the documents even when positioned under the lens.

From the foregoing it is apparent that the present invention provides mechanism by which photographs or documents may be taken with precision and dispatch. While one lot of documents is being photographed, an additional lot is being assembled on the conveyer in readiness to be moved under the lens simultaneously with the removal of the exposed documents, automatically removed from the conveyer at the end thereof. Documents are accurately guided during the first part of their movement under the lens so that there is no likelihood of their over-lapping even if the operator has deposited them hastily upon the conveyer. In case it is desired to photograph a large sized document at any time during the operation of the apparatus, this can be done by simply raising the cover on its hinges and slipping the document thereunder.

As numerous changes in the embodiment as herein disclosed may be made, without departing from the spirit of the invention, it is, therefore, desired that the present embodiment be considered in all respects in an illustrative, not a restrictive sense, reference being had to the appended claims rather than to the foregoing description to indicate the scope of the invention.

I claim as my invention:

1. In a photographic apparatus, the combination with a camera and lens, of endless conveying mechanism arranged to hold objects to be copied and to carry them horizontally into the field of the lens embodying rotary supports, and supporting elements for said rotary supports on which the latter are bodily adjustable toward and from said lens.

2. In a photographic apparatus, the combination with a camera and lens, of a conveying mechanism arranged to hold objects in photographic relation to said lens, means for operating said conveying mechanism to carry objects within the optical field of said lens, and a device on the lens side of the conveyer movable to and from a position fixed relatively to said lens for selectively engaging documents placed on said conveying mechanism and for holding them flat against said conveying mechanism while being photographed.

3. In a photographic apparatus, the combination with a camera and lens, of an endless copyholding conveyer disposed in photographic relation to said lens, stationary positioning mechanism associated therewith for insuring the accurate placing of a copy or document thereon, mechanism for operating said conveyer to bring the copies thereon within the field of said lens, and a device disposed adjacent the lens field for selectively engaging and holding documents in flat condition while being photographed.

4. In a photographic apparatus, the combination with a camera and lens, of a copyholding conveyer extending from a flat feeding position outside of the camera field to an exposing position within said field, and a relatively fixed guide cooperating with said conveyer for maintaining documents placed thereon in a predetermined path when said conveyer is actuated.

5. In a photographic apparatus, the combination with a camera and lens of an endless copy holding conveyer extending from a feeding position outside of the camera field to an exposing position within said field, said conveyer comprising a flexible member provided with a groove disposed in the direction of its travel, and a guide member disposed in said groove and adapted to maintain documents placed on said conveyer in a fixed path relatively thereto.

6. In a photographic apparatus, the combination with a camera and lens of an endless copy holding conveyer extending from a feeding position outside of the camera field to an exposing position within said field, said conveyer comprising a flexible member provided with a groove disposed in the direction of its travel, and a guide member supported independently of said conveyer and projecting into said groove, said guide member being adapted to maintain documents placed on said conveyer in a fixed path relatively thereto.

7. In a photographic apparatus, the combination with a camera and lens of an endless copy holding conveyer extending from a feeding position outside of the camera field to an exposing position within said field, said conveyer comprising a flexible member provided with a groove disposed in the direction of its travel, and a guide bar supported independently of said conveyer, outside of the camera field and projecting into said groove, said guide bar being adapted to maintain documents placed on said conveyer in a fixed path relatively thereto.

8. In a photographic apparatus, the combination with a camera and lens, of a copy conveyer extending from a feeding position outside of the camera field to an exposing position within said field, mechanism disposed adjacent the camera field for yieldingly supporting a portion of said conveyer, and a holding device positioned adjacent the camera field independently of the conveyer but movable toward and from the same for bearing against a document on said conveyer to hold the same in flat condition thereon.

9. In a photographic apparatus, the combination with a camera and lens, of a horizontal copy conveyer extending from a flat offset feeding position outside of the camera field of sufficient extent to hold documents flat thereon to an exposing position within said field, said conveyer comprising a flexible conveying member, a holding device selectively engageable with the carrying surface of said flexible conveying member to hold documents in flat condition thereon, and mechanism for yieldingly supporting said conveying member for downward movement whereby a document will be yieldingly held between the conveying member and the holding device.

10. In a photographic apparatus the combination with a camera and lens, of a copy carrying conveyer extending from a feeding position of substantial area outside of the camera field to an exposing position within said field, a copy hold-down device mounted adjacent the camera field between the conveyer and the lens, mechanism for raising and lowering said hold-down device, said hold-down device, when raised, forming an entrance opening therebeneath, and mechanism for operating said conveyer to carry documents from the feeding position through said entrance opening to the exposing position, said hold-down mechanism, when lowered, serving to hold documents flat against said conveyer.

11. In a photographic apparatus the combination with a camera and lens, of a copy carrying conveyer arranged to hold documents in operative relation to said lens, a device disposed adjacent the lens field for selectively engaging and holding documents in flat condition while being photographed, said device comprising a vertically movable frame, a transparent plate pivotally mounted in said frame, and means associated with said frame and plate for locking said plate from pivotal movement with respect to said frame.

12. In a photographic apparatus, the combination with a camera embodying a lens, of a transparent plate at the focus of said lens, a flexible copy conveyer arranged to travel therebeneath, mechanism for moving said plate into contact with the surface of said conveyer, and a yielding element associated with said conveyer for pressing the carrying surface thereof together with the copy against said transparent plate.

13. In a photographic apparatus, the combination with a camera embodying a lens, of a transparent plate at the focus of said lens, a flexible articulated copy conveyer arranged to travel therebeneath, mechanism embodying a hand crank for moving said plate into and out of contact with the surface of said conveyer while the latter is at rest, and a yielding element supported independently of said conveyer for pressing said conveyer together with the copy against said transparent plate.

14. In a photographic apparatus, the combination with a camera embodying a lens, of a transparent plate at the focus of said lens, a copy conveyer presenting a flat object supporting surface arranged to travel therebeneath, and parallel motion mechanism associated with said transparent plate for moving said plate into and out of contact with an exposing field comprising only a portion of such surface of said conveyer.

15. In a photographic apparatus, the combination with a camera embodying a lens, of a transparent plate at the focus of said lens, a copy conveyer arranged to travel therebeneath, guiding mechanism for said transparent plate adapted to maintain said plate in parallel relation to said conveyer, and parallel motion mechanism embodying toggle mechanism for moving said transparent plate toward and from said conveyer and for locking it in position at the limits of its movement in either direction.

16. In a photographic apparatus, the combination with a camera embodying a lens, of a transparent plate at the focus of said lens, an endless copy conveyer arranged to travel beneath said plate, guiding mechanism for said transparent plate adapted to maintain said plate in parallel relation to said conveyer, a parallel motion mechanism embodying toggle mechanism located between the runs of said endless conveyer for moving said transparent plate toward and from said conveyer and for locking it in position at the limit of its movement in either direction.

ARTHUR W. CAPS.